July 14, 1925.

J. B. HARRIS

EYESHADE

Filed May 21, 1923

1,546,344

Inventor
Joseph B. Harris

By ............... Attorney

Patented July 14, 1925.

1,546,344

UNITED STATES PATENT OFFICE.

JOSEPH B. HARRIS, OF CLEVELAND, OHIO, ASSIGNOR TO THE H. & A. MANUFACTURING COMPANY, OF CLEVELAND, OHIO, A CORPORATION OF OHIO.

EYESHADE.

Application filed May 21, 1923. Serial No. 640,364.

*To all whom it may concern:*

Be it known that I, JOSEPH B. HARRIS, a citizen of the United States, residing at Cleveland, in the county of Cuyahoga and State of Ohio, have invented certain new and useful Improvements in Eyeshades, of which the following is a specification.

My invention relates to improvements in eye-shades or visors, and more particularly to that class or type designed for use in connection with the lenses of spectacles, eye-glasses, and the like.

The primary object of the invention is to provide a generally improved lens shade or visor of the type or class indicated which will be exceedingly simple in construction, cheap of manufacture, and efficient in use.

A further and very important object is the provision of a lens shade or visor which may be quickly attached to or detached from the lens portions of spectacles and eye-glasses of widely varying forms and types and which when attached will be securely retained in position without impairing or interfering with the ordinary functions of the lenses and relieving the eyes of eye-strain such as frequently arises from direct and refracted and reflected rays of light.

A still further and important object is the provision of an improved shade of this class adapted for use as a substitute for and improvement on the ordinary commercial eye-shade or visor, the present embodiment of the invention being of particular advantage in the driving of automobiles, as well as for interior work where artificial light is used or wherever the ordinary eye-shade is used but without the well known objectionable features of the latter.

With the above mentioned and other ends in view, the invention consists in the novel construction, arrangement and combination of parts, hereinafter described, illustrated in one of its embodiments in the accompanying drawings, and particularly pointed out in the appended claims.

Figure 1:
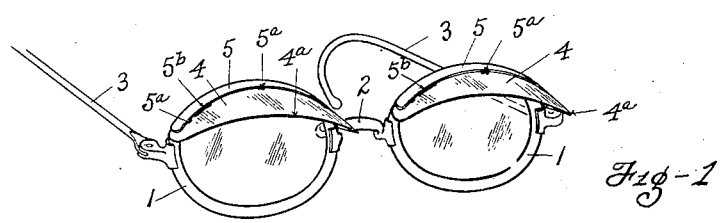

Referring to the drawings, forming a part of this specification, Figure 1 is a perspective view of a pair of eye lenses of the frame or spectacle type equipped with a pair of eye-shades or visors constructed and applied in accordance with this invention.

Figure 2:
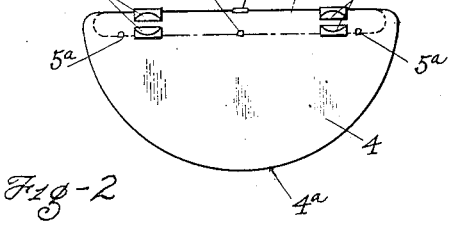

Fig. 2, a plan view of the underside of one of the shade or visor elements in flat or commercial form preparatory to being bent and conformed and attached upon the upper portion of an eye-glass or spectacle lens.

Figure 3:
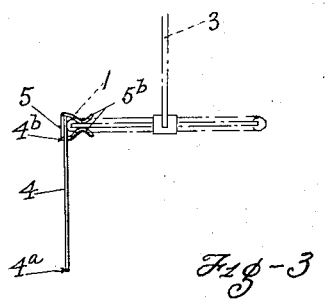

Fig. 3, an edge view of the same before being so conformed and applied, the dotted lines illustrating the relative position of the parts when being applied to a lens of the spectacle type, such as shown in Fig. 1 of the drawings.

Figure 4:
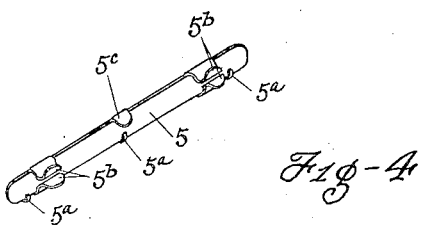

Fig. 4, a perspective view of the improved visor supporting and reinforcing element or bow, together with the attaching prongs and tongues on the latter for attaching to the visor and connecting the visor to the upper edge of a lens.

Similar numerals of reference designate like parts throughout all the figures of the drawings.

The improved lens shade or visor is adapted to be readily attached to or detached from the upper portion of the eye lens of the spectacles or eye-glasses, as the case may be. For the purpose of illustration I have shown my lens shade or visor in connection with a pair of spectacles consisting, in the present instance, of the usual lens surrounded by a lens frame 1, connected by the usual bridge or nose piece 2, and provided with bows 3.

The visor or shade element 4 may be of any suitable and convenient material, preferably of light weight translucent material such as celluloid similar to that used in the ordinary shade or visor in common use which extends entirely above the eyes of the user.

The shade element 4 preferably comprises a segmental sheet of celluloid having a curved front edge 4ª and an attaching base or chordal edge portion 4ᵇ.

As a convenient means of adapting the shade or visor element to lenses of varying forms and contours, the shade element 4 is preferably formed of relatively flat stock and so likewise with respect to the chordal visor supporting and reinforcing bow 5, as shown most clearly in Figs. 2 and 3 of the drawings.

As a means of conveniently supporting the shade element when conformed to the contour of the upper edge of the lens to be shaded and particularly as a means of conveniently attaching such shade or vizor element to or detaching the same from such lens, the reinforcing strip or bow 5 is preferably formed of light weight flexible spring material, such as metallic spring material and yet having a tendency to hold the final contour or shape given to the same when conformed to and attached upon the upper edge of the lens.

The strip or bow 5 is arranged immediately above the attaching base portion 4ᵇ of the shade element and is provided on its opposite edges with attaching prongs 5ᵃ and spring tongues 5ᵇ. The prongs or fangs 5ᵃ extend through suitable openings in the shade material 4 and are bent down on the under side thereof, and the resilient tongues 5ᵇ are preferably arranged in pairs near the outer ends of the reinforcing strips or bows 5. The tongue elements 5ᵇ are preferably arranged in spaced relation and preferably have their outer or free ends bent outwardly in curved flaring or diverging relation so as to more conveniently receive and pass over the upper edges of the lens to clamp the latter, or where the lens is mounted in a lens frame 1 to pass over and interlock with the latter when attached. In the present instance the rear spring tongues 5ᵇ extend over the marginal edge of the shade element and so likewise the intermediate attaching element 5ᶜ, thereby holding the rear edge of the strip or bow 5 in registration with the base portion 4ᵇ.

It will be apparent therefore that the resilient strip or bow 5 with its resilient attaching elements or tongues 5ᵇ constitutes a resilient attaching base portion for attaching and supporting the shade element as a whole and resiliently receiving and engaging the upper marginal edges of the lens, or the latter together with the lens frame 1 where used in connection with a lens surrounded by a frame as in spectacles.

Having thus described one of the embodiments of my invention, without having attempted to set forth all the forms in which it may be made, or all the modes of its use, what I claim and desire to secure by Letters Patent, is—

1. A lens shade or visor, comprising a segmental visor element having a chordal visor supporting and reinforcing bow provided with attaching prongs extending through said visor element along the chordal edge thereof, said supporting bow terminating near its ends in oppositely disposed spring tongues projecting on one side of said visor element.

2. A lens shade or visor, comprising a curved segmental visor having a visor supporting and reinforcing bow extending along the marginal base portion thereof and having attaching prongs extending therethrough, said supporting bow terminating near its ends in oppositely disposed spring tongues projecting on the concave side of said visor.

3. As a new article of manufacture, an eye-shade comprising normally flat lens shading elements of translucent celluloid of substantially semi-circular shape and adapted to be curved transversely to conform to and closely engage the upper marginal edges of a pair of eye lenses, and flexible chordal bows on said shading elements terminating in resilient tongue members receiving and interlocking with the upper marginal edges of the eye lenses and holding said shading elements in such curved and conformed mounted position.

In testimony whereof I have affixed my signature.

JOSEPH B. HARRIS.